(12) United States Patent
McCann et al.

(10) Patent No.: US 8,919,891 B2
(45) Date of Patent: Dec. 30, 2014

(54) ELECTROHYDRAULIC ANTILOCK BRAKE SYSTEM WITH ISOLATION VALVE

(71) Applicant: Caterpillar Inc., Peoria, IL (US)

(72) Inventors: Gerard O. McCann, Dunlap, IL (US); John J. Kaufman, Yorkville, IL (US); Joseph E. Tabor, Forsyth, IL (US)

(73) Assignee: Caterpillar Inc., Peoria, IL (US)

( * ) Notice: Subject to any disclaimer, the term of this patent is extended or adjusted under 35 U.S.C. 154(b) by 241 days.

(21) Appl. No.: 13/664,471

(22) Filed: Oct. 31, 2012

(65) Prior Publication Data

US 2014/0117750 A1 May 1, 2014

(51) Int. Cl.
*B60T 7/00* (2006.01)

(52) U.S. Cl.
USPC .......................................................... 303/15

(58) Field of Classification Search
CPC .......... B60T 8/176; B60T 8/34; B60T 8/885; B60T 8/4072
USPC .......... 303/113.1, 15, 119.1, 113.2, 119.2, 13
See application file for complete search history.

(56) References Cited

U.S. PATENT DOCUMENTS

| 4,668,023 | A | 5/1987 | Every et al. |
| 4,819,995 | A * | 4/1989 | Lohmann et al. .......... 303/113.2 |
| 6,976,741 | B2 | 12/2005 | Hara et al. |
| 6,994,406 | B1 | 2/2006 | Krawczyk et al. |
| 2008/0106143 | A1 | 5/2008 | Yazaki et al. |
| 2011/0270497 | A1 * | 11/2011 | Uematsu et al. ................. 701/50 |

FOREIGN PATENT DOCUMENTS

| GB | 1402690 | 9/1972 |
| GB | 2262580 | 6/1993 |

* cited by examiner

*Primary Examiner* — Melanie Torres Williams
(74) *Attorney, Agent, or Firm* — Miller, Matthias & Hull

(57) ABSTRACT

An antilock brake system for a vehicle may include a controller that is linked to a brake pedal sensor. The brake pedal sensor may be linked to a brake pedal. The brake pedal may be coupled to a normally closed brake pedal valve. The brake pedal valve may include an inlet in communication with a source of pressurized hydraulic fluid and an outlet in communication with a normally opened isolation valve. The isolation valve may be in communication with one or more main control valve systems and may be linked to a controller which maintains the isolation valve in a closed position during normal operating conditions. The isolation valve then shifts to an open position in the event current supply by the controller is interrupted as a result of an electrical failure or malfunction of the controller.

20 Claims, 2 Drawing Sheets

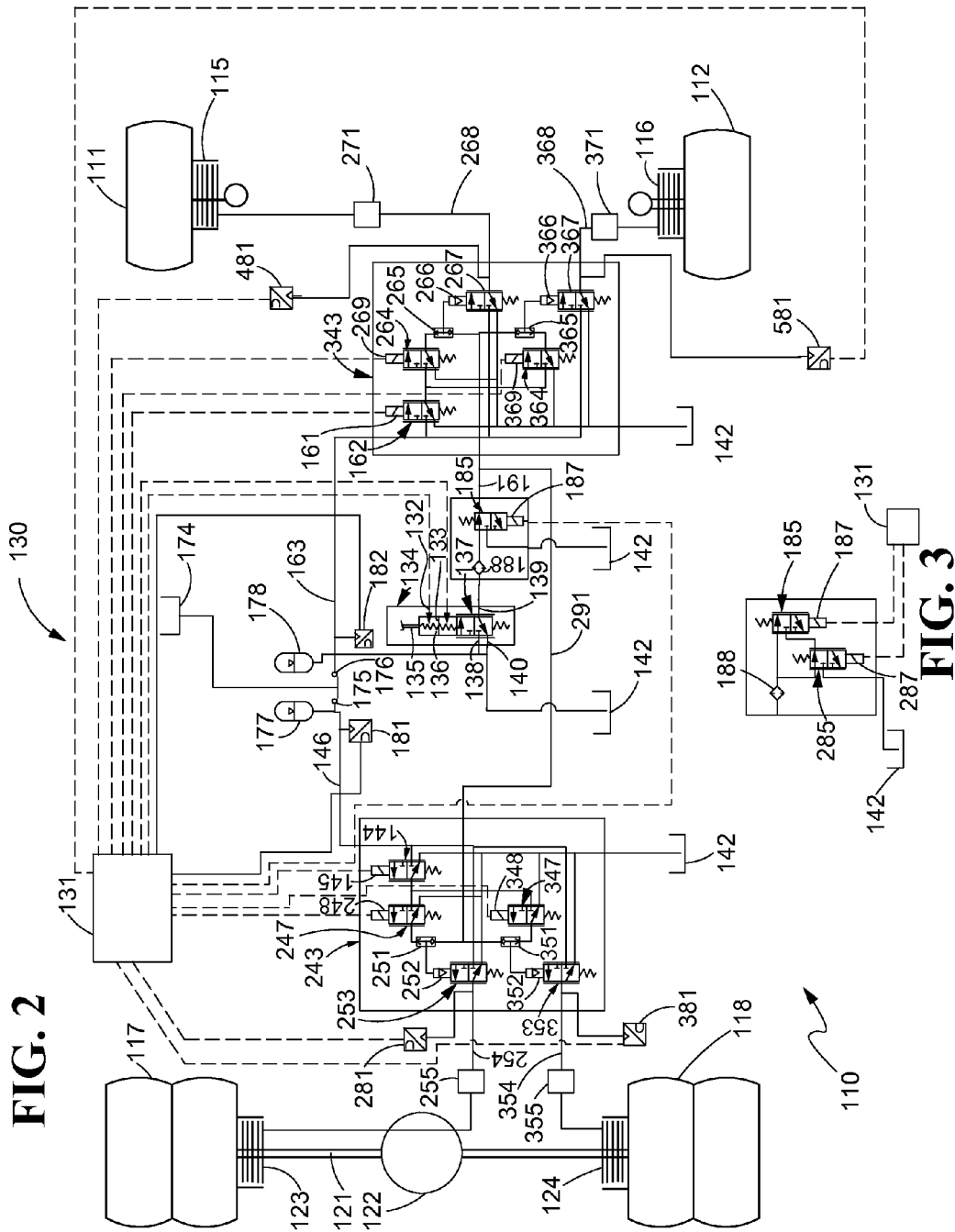

US 8,919,891 B2

ELECTROHYDRAULIC ANTILOCK BRAKE SYSTEM WITH ISOLATION VALVE

BACKGROUND

1. Technical Field

This disclosure relates to antilock brake systems and, more specifically, to electrohydraulic antilock brake systems.

2. Description of the Related Art

Braking a vehicle in a controlled manner under adverse conditions such as rain, snow, or ice generally requires precise application of the brakes by the vehicle driver. Under these conditions, or in panic stop situations, a driver will often apply excessive brake pressure, thereby causing the wheels to lockup and slip or skid on the road surface. Wheel lockup conditions can lead to loss of directional stability and, possibly, uncontrolled vehicle spinout.

In a continuing effort to improve the operational safety of vehicles, antilock braking systems have been developed. While such systems are adapted to control the braking of each braked wheel of a vehicle, some systems have been developed for controlling the braking of only a portion of the braked wheels. Generally, antilock brake systems are electrohydraulic and include a controller and sensors for monitoring the speed of the controlled wheels to determine the deceleration of the controlled wheels. Antilock brake systems also include one or more hydraulic circuits for applying pressure to the brakes of the controlled wheels. When the brakes of the vehicle are applied and the wheel deceleration of the monitored wheels exceeds a predetermined deceleration threshold, indicating that there is wheel slippage and the wheels are approaching a lockup condition, the controller functions to control the application of hydraulic pressure through a series of valves associated with the brakes to prevent a lockup of the controlled wheels. Typically, the controller will deactivate and activate the valves to cyclically release and reapply pressure to the brakes to limit wheel slippage to a safe level while continuing to produce adequate brake torque to decelerate the vehicle as desired by the driver.

Dual-circuit hydraulic antilock brake systems are widely used in vehicles which have two groups of wheels equipped with brakes, i.e., front and rear brakes. Dual-circuit hydraulic antilock brake systems include a pair of hydraulic brake circuits which are hydraulically independent of each other. One brake circuit is adapted to establish a braking pressure to be applied to the front wheel brake cylinders, while the other brake circuit is adapted to establish another independent braking pressure to be applied to the rear wheel brake cylinders. An example of such a dual-circuit hydraulic antilock brake system is disclosed in U.S. Pat. No. 4,824,183.

Because modern antilock brake systems are not purely hydraulic, but are electrohydraulic, in the event of an electrical failure a controller malfunction, an electrohydraulic antilock brake system will not operate properly. Because such an electrical failure will present a safety hazard, a reliable means for converting an electrohydraulic antilock braking system to a hydraulic braking system is needed in the event of an electrical failure or controller malfunction.

SUMMARY OF THE DISCLOSURE

In one aspect, an antilock brake system for a vehicle is disclosed. The disclosed antilock brake system may include a controller. The controller may be linked to a brake pedal sensor. The brake pedal sensor may be linked to a brake pedal. The brake pedal may be coupled to a normally closed brake pedal valve. The brake pedal valve may include an inlet that may be in communication with a source of pressurized hydraulic fluid and an outlet that may be in communication with a normally open isolation valve. The isolation valve may be in communication with a main control valve system. The isolation valve may also be linked to the controller which may maintain the isolation valve in a closed position during normal operating conditions by supplying current to the isolation valve. The isolation valve may shift to an open position in the event current supplied by the controller is interrupted. The main control valve system may be in communication with the source of pressurized hydraulic fluid and the at least one brake assembly. The main control valve system may also be linked to the controller for controlling the flow of hydraulic fluid to the at least one brake assembly.

In another aspect, an articulated truck is disclosed which may include a plurality of wheels including at least one front wheel coupled to a front brake assembly and at least one rear wheel coupled to a rear brake assembly. The front and rear brake assemblies may be coupled to an antilock brake system. The antilock brake system may include a controller. The controller may be linked to a brake pedal sensor. The brake pedal sensor may be linked to a brake pedal. The brake pedal may be coupled to a normally closed brake pedal valve. The brake pedal valve may include an inlet in communication with a source of pressurized hydraulic fluid and an outlet in communication with a normally open isolation valve. The isolation valve may be in communication with a main control valve system. The isolation valve may also be linked to a controller which may maintain the isolation valve in a closed position during normal operating conditions by supplying current to the isolation valve. The isolation valve may shift to an open position in the event current supplied by the controller is interrupted, such as in the case of an electrical failure or controller malfunction. The main control valve system may include a rear brake inlet and a front brake inlet, both of which may be in communication with the source of pressurized hydraulic fluid. The rear brake inlet may be in communication with a rear brake pressure control valve and a rear brake valve. The rear brake pressure control valve may be linked to the controller and may be in communication with a rear brake actuator of the rear brake valve. The rear brake valve may be in communication with the rear brake assembly and the rear brake inlet. The front brake inlet may be in communication with a front brake pressure control valve. The front brake pressure control valve may be linked to the controller and may also be in communication with a front brake actuator of the front brake valve. The front brake valve may be in communication with the front brake assembly and the front brake inlet.

In yet another aspect, a method of braking an articulated truck equipped with an electrohydraulic antilock brake system when there is an electrical failure is disclosed. The antilock brake system may include a controller linked to a brake pedal sensor. The brake pedal sensor may be linked to a brake pedal. The brake pedal may be coupled to a normally closed brake pedal valve. The brake pedal valve may include an inlet in communication with a source of pressurized hydraulic fluid and an outlet in communication with a normally open isolation valve. The isolation valve may be in communication with a main control valve system. The isolation valve may also be linked to the controller which maintains the isolation valve in a closed position during normal operating conditions by supplying current to the isolation valve. The isolation valve may shift to an open position in the event the current supplied by the controller is interrupted. The main control valve system may be in communication with the source of pressurized hydraulic fluid and with at least one brake assembly. The main control valve system may be linked to the controller for controlling the flow of hydraulic fluid to the at least one brake assembly. The method may include shifting the isolation valve to an open position when current from the controller of the isolation valve is interrupted and passing pressurized hydraulic fluid from the pressurized hydraulic fluid source through the brake pedal valve and through the isolation valve to the main control valve system.

In any one or more of the embodiments described above, the main control valve system may include a rear brake inlet in communication with the source of pressurized hydraulic fluid and a front brake inlet in communication with the source of pressurized hydraulic fluid. Further, the rear brake inlet may be in communication with a rear brake pressure control valve and a rear brake valve. The rear brake pressure control valve may be linked to the controller and in communication with a rear brake actuator of the rear valve. The rear brake valve may be in communication with at least one rear brake assembly and the rear brake inlet of the main control valve system. The front brake inlet may be in communication with a front brake pressure control valve. The front brake pressure control valve may be linked to the controller and may be in communication with a front brake actuator of the front brake valve. The front brake valve may be in communication with at least one front brake assembly and the front brake inlet of the main control valve system.

BRIEF DESCRIPTION OF THE DRAWINGS

FIG. 2 schematically illustrates another disclosed electrohydraulic antilock braking system.

FIG. 3 schematically illustrates an alternative to the isolation valve disclosed in FIGS. 1 and 2.

DETAILED DESCRIPTION OF THE PRESENTLY PREFERRED EMBODIMENTS

Figure 1:
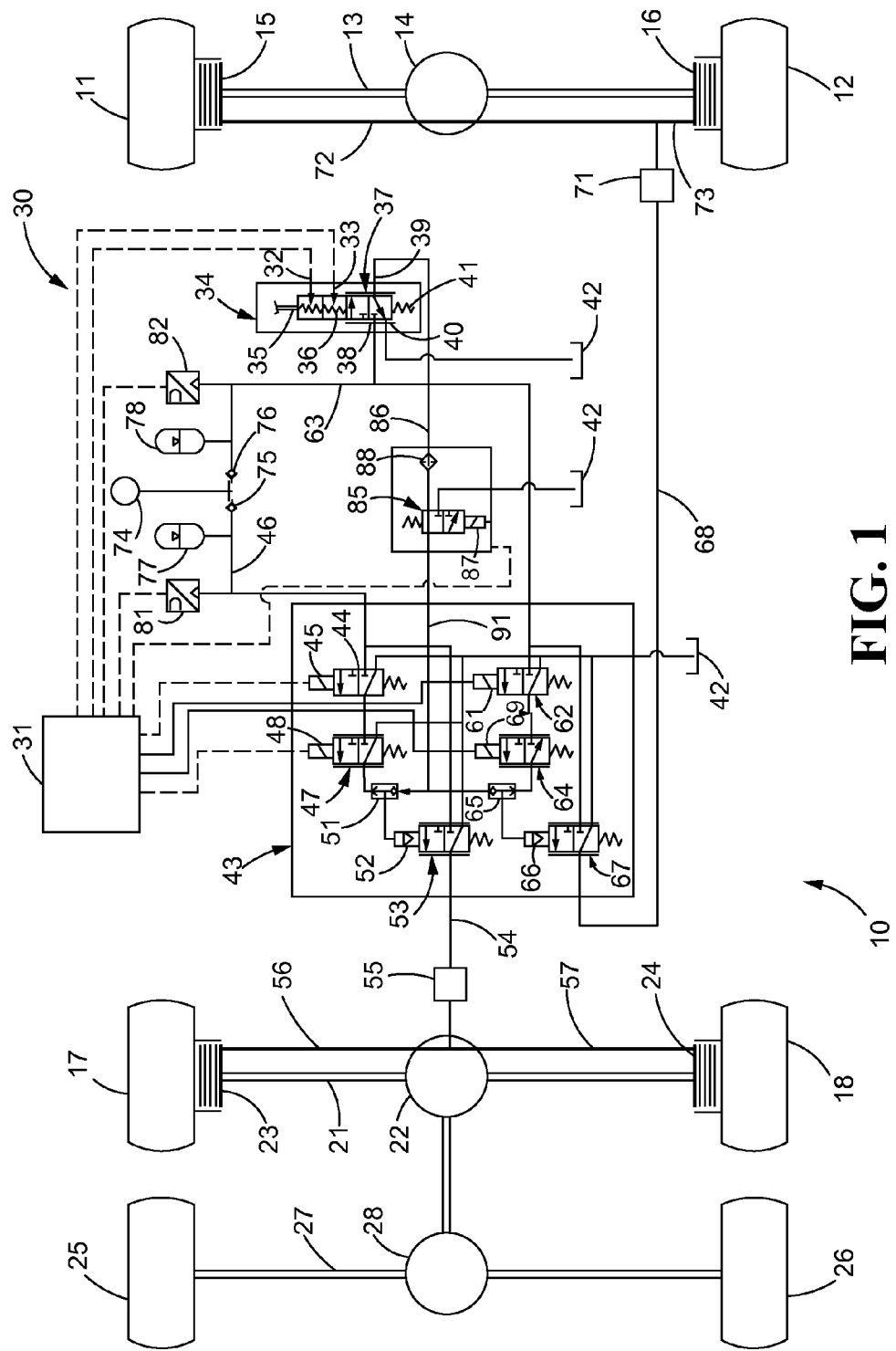
FIG. 1 schematically illustrates one disclosed electrohydraulic antilock braking system.

Turning first to FIG. 1, a partial view of an articulated truck 10 is shown which may include a pair of front wheels 11, 12 coupled together by an axle 13 and a differential 14. Each front wheel 11, 12 may also be equipped with front brake assemblies 15, 16 respectively. Similarly, the articulated truck 10 may also include rear wheels 17, 18 that may be coupled together by an axle 21 and a rear differential 22. The rear wheels 17, 18 may also be equipped with rear brake assemblies 23, 24 respectively. The articulated truck 10 may also include a second pair of rear wheels 25, 26 that are coupled together by a second rear axle 27 and a second rear differential 28 as shown. While the additional rear wheels 25, 26 are illustrated without brake assemblies, those skilled in the art may recognize that it may be advantageous to include brake assemblies on all of the rear wheels 17, 18, 25, 26.

The articulated truck 10 may be equipped with an antilock brake system 30 that may include a controller 31 that may include an electronic control module (ECM). The controller 31 may be linked to a pair of brake pedal sensors 32, 33 that are part of a brake pedal assembly 34. The brake pedal assembly 34 may include a brake pedal 35, pedal position sensors 36, a biasing element 41 and a brake pedal valve 37. The brake pedal valve 37 may be a proportional control valve with three ports and infinite positions as shown in FIG. 1. The three ports may include a brake pedal valve inlet 38, a brake pedal valve outlet 39 and a brake pedal valve dump outlet 40, which is in communication with a return reservoir 42.

Upon depression of the brake pedal 35, the sensors 32, 33 may communicate signals indicative of the force imposed upon the brake pedal 35 by the operator to the controller 31. The controller 31, in turn, may then send a series of signals to the main control valve system 43. The main control valve system 43 may include a plurality of valves for controlling the flow of pressurized hydraulic fluid to the front brake assemblies 15, 16 and rear brake assemblies 23, 24 in the following manner. Specifically, the controller 31 may send a signal to the rear brake pilot valve 44 which may be a normally closed directional control valve with three ports and two positions. The rear brake pilot valve 44 may include a solenoid 45 that receives the signal from the controller 31 and shifts the rear brake pilot valve 44 from the closed position shown in FIG. 1 to an open position (not shown) that provides communication between the pressurized hydraulic fluid line 46 and the rear brake pressure control valve 47. The rear brake pressure control valve 47 may be a normally closed directional control valve with three ports and two positions as shown in FIG. 1 and with a solenoid 48 in communication with the controller 31.

With the rear brake pilot valve 44 in an open position, hydraulic fluid from the pressurized hydraulic fluid line 46 flows through the rear brake pilot valve 44 to the rear brake pressure control valve 47 which may receive signals from the controller 31 to open the rear brake pressure control valve 47 thereby communicating fluid to the rear brake shuttle valve 51. The rear brake shuttle valve 51 permits the flow of fluid to the hydraulic actuator 52 of the rear brake valve 53 which may be a normally closed proportional control valve with three ports and infinite positions as shown in FIG. 1. The hydraulic actuator 52, upon receiving pressurized hydraulic fluid from the shuttle valve 51, may shift the rear brake valve 53 to an open position thereby providing communication between the pressurized hydraulic fluid line 46 and the rear brake fluid line 54. The rear brake fluid line 54 may be coupled to a rear brake slack adjuster 55 before the flow is divided into the left rear brake fluid line 56 and right rear brake fluid line 57. The left and right rear brake fluid lines 56, 57 then deliver pressurized hydraulic fluid to the left and right rear brake assemblies 23, 24 respectively as shown in FIG. 1.

Similarly, regarding the delivery of pressurized hydraulic fluid to the left and right front brake assemblies 15, 16, the controller 31, upon receiving signals from the brake pedal sensors 32, 33 may deliver a signal to the solenoid 61 of the front brake pilot valve 62 which may also be a normally closed directional control valve with three ports as shown in FIG. 1. The solenoid 61 may then shift the front brake pilot valve 62 to an open position thereby providing fluid communication between the pressurized hydraulic fluid line 63 and the front brake pressure control valve 64. When open, the front brake pressure control valve 64 delivers the pressurized hydraulic fluid to the front brake shuttle valve 65 which, in turn, delivers pressurized hydraulic fluid to the hydraulic actuator 66 of the front brake valve 67. The front brake valve 67 may also be a normally closed directional control valve with three ports as shown in FIG. 1. When open, the front brake valve 67 passes fluid into the front brake fluid line 68 which may pass through a front brake slack adjuster 71 before the fluid is split into the left front brake fluid line 72 and right front brake fluid line 73, which deliver pressurized fluid to the left and right front brake assemblies 15, 16 respectively. Pressurized fluid is delivered to the pressurized hydraulic fluid lines 46, 63 from the pump 74 and through the check valves 75, 76. Each pressurized hydraulic fluid line 46, 63 may be in communication with an accumulator 77, 78 respectively. Further, the controller 31 may monitor the pressure in the fluid lines 46, 63 via the pressure sensor 81, 82 respectively.

Therefore, the antilock brake system 30 of FIG. 1 is an electrohydraulic system. In the event of an electrical failure or a malfunction of the controller 31, appropriate signals may not be delivered to the solenoids 45, 48, 61, and 69. The pilot valves 44, 62 and front brake pressure control valves 47, 64 may remain closed thereby presenting a possible safety hazard. To alleviate this problem, an isolation valve 85 may be provided that is in communication with the brake pedal valve 37 via the fluid line 86. The isolation valve 85 may be a normally open directional control valve with three ports as shown in FIG. 1. When the antilock brake system 30 is functioning in a normal manor, a signal may be transmitted from the controller 31 to the solenoid 87 of the isolation valve 85 thereby closing the isolation valve 85. As a result, during normal operation of the antilock brake system 30, the isolation valve 85 remains closed. For example, if the solenoids 48, 45 erroneously fail to energize, then the level or braking demanded by the operator will occur because the shuttle valves 65, 51 will select for their outputs the higher of the two inputs which, in this case, would be the level of braking demanded by the operator.

However, in the event of an electrical failure or a malfunction of the controller 31, a signal will not be delivered to the solenoid 87 thereby causing the isolation valve 85 to shift to the open position shown in FIG. 1. In the open position as shown in FIG. 1, pressurized fluid flows through the line 86, through the filter or screen 88 and through the line 91 which is in communication with the rear brake shuttle valve 51 and the front brake shuttle valve 65. The fluid delivered by the open isolation valve 85 passes through the shuttle valves 51, 65 to the hydraulic actuators 52, 66 thereby opening the rear brake valve 53 and front brake valve 67 respectively to enable the brake system 30 to operate in a purely hydraulic manner.

By providing an isolation valve 85 that is in a normally open position, and designing the system 30 so the isolation valve 85 is shifted to a closed position during normal operation, the isolation valve 85 is regularly opened and closed and, accordingly, in the event of an electrical malfunction or failure, the isolation valve 85, which is routinely opened and closed, has a reduced possibility of being stuck in the incorrect or closed position when the system 30 needs to convert from an electrohydraulic system to a hydraulic system. When the antilock hydraulic system 30 is functioning properly and the isolation valve 85 is shifted to the closed position, any fluid in the line 91 is dumped to the unpressurized reservoir 42 as shown in FIG. 1. Similarly, the rear brake pilot valve 44 and front brake pilot valve 62 are also in communication with the unpressurized reservoir 42 when the valves 44, 62 are in the closed position as shown in FIG. 1.

A similar scheme for converting a more complex system from an electrohydraulic system to a hydraulic system in the event of an electrical failure or malfunction is illustrated in FIG. 2. Components or parts of FIG. 2 that have equivalent counterparts in the system 30 of FIG. 1 will be numbered similarly but will include a prefix "1" (i.e., the system 130 of FIG. 2 versus the system 30 of FIG. 1). Components or parts without equivalent counterparts in FIG. 1 will be labeled with reference numerals greater than 200.

Accordingly, a rigid truck 110 is illustrated in FIG. 2 and may be equipped with an electrohydraulic antilock brake system 130. The antilock brake system 130 may include a controller 131 that may be in communication with a rear brake main control valve system 243 as well as a front brake main control valve system 343. The system 130 may also include a brake pedal assembly 134 that may be similar in design to the brake valve assembly 34 of FIG. 1. In short, the operator depresses the brake pedal 135 causing the sensors 132, 133 to send signals to the controller 131 which, in turn, sends signals to the rear brake main control valve system 243 and front brake main control valve system 343. Referring to the rear brake main control valve system 243, the controller 131 may send a signal to the solenoid 145 of the rear brake pilot valve 144 to open the rear brake pilot valve 144 and provide communication between the pressurized hydraulic fluid line 146 and the left rear brake pressure control valve 247 that may also be equipped with a solenoid 248 that may be in communication with the controller 131.

Upon receiving a signal from the controller 131, the solenoid 248 shifts the left rear brake pressure control valve 247 from the closed position shown in FIG. 2 to an open position thereby providing pressurized hydraulic fluid to the left rear brake shuttle valve 251. The left rear brake shuttle valve 251 then communicates fluid to the hydraulic actuator 252 of the left rear brake valve 253 thereby shifting the left rear brake valve 253 from the closed position shown in FIG. 2 to an open position which establishes communication between the pressurized hydraulic fluid line 146 and the left rear brake fluid line 254. Fluid passing through the left rear brake fluid line 254 may also pass through a left rear brake slack adjuster 255 before being delivered to the left rear brake assembly 123.

Similarly, the open rear brake pilot valve 144 provides communication between the pressurized hydraulic fluid line 146 and the right rear brake pressure control valve 347 which may also include a solenoid 348 that is in communication with the controller 131. The controller 131 may send signals to the solenoid 348 to open the right rear brake pressure control valve 347 thereby opening the valve 347 to provide communication between the pressurized hydraulic fluid line 146 and the right rear brake shuttle valve 351. Fluid flowing through the right rear brake shuttle valve 351 is delivered to the hydraulic actuator 352 of the right rear brake valve 353 thereby opening the valve 353 and providing communication between the pressurized hydraulic fluid line 146 and the right rear brake fluid line 354 which may include a right rear brake slack adjuster 355. Fluid is then delivered to the right rear brake fluid assembly 124.

Pressure sensors 281 and 381 may be employed to monitor the pressure of the fluid being delivered through the left rear brake fluid line 254 and the right rear brake fluid line 354 respectively. Turning to the front main control valve system 343, pressurized fluid from the pressurized hydraulic fluid reservoir 174 may pass through the check valve 176 and into the pressurized hydraulic fluid line 163 before being delivered to the front brake pilot valve 162. A signal from the controller 131 to the solenoid 161 causes the front brake pilot valve 162 to open thereby permitting fluid to flow from the pressurized fluid line 163 to the left front brake pressure control valve 264 and the right front brake pressure control valve 364. Signals from the controller 131 to the solenoids 269, 369 cause the left and right front brake pressure control valves 264, 364 respectively to open thereby delivering fluid to the left front brake shuttle valve 265 and the right front brake shuttle valve 365 respectively. Fluid flows through the shuttle valves 265, 365 to the hydraulic actuators 266, 366 of the left and right brake valves 267, 367 respectively thereby causing the left and right brake valves 267, 367 to open and deliver fluid to the left front brake fluid line 268 and right front brake fluid line 368 respectively. The fluid lines 268, 368 may also include slack adjusters 271, 371 respectively and are coupled to the left front brake assembly 115 and right front brake assembly 116 respectively. Fluid flowing through the lines 268, 368 may be monitored by pressure sensors 481, 581 respectively.

In the event of a electrical failure or malfunction of the controller 131, a signal or current may not be supplied to the solenoid 187 of the isolation valve 185 thereby causing the isolation valve 185 to assume its normally open position shown in FIG. 2. In the open position, the isolation valve 185 receives fluid passing through the brake pedal assembly 134 and delivers the fluid to the front brake line 191 which is in communication with the front brake shuttle valves 265, 365 and the rear brake line 291, which is in communication with the shuttle valves 251, 351 as shown in FIG. 2. Thus, like the isolation valve 85 of FIG. 1, the isolation valve 185 of FIG. 2 converts the antilock brake system 130 from an electrohydraulic antilock brake system to a hydraulic brake system. The pilot valves 144, 162, rear brake pressure control valves 247, 347 and front brake pressure control valves 264, 364 are bypassed. Again, the isolation valve 185 may be a normally open directional control valve with three ports and two finite positions. When the system 130 and/or controller 131 are operating properly and a signal or current is being delivered to the solenoid 187, the isolation valve 185 is in communication with the unpressurized return reservoir 142 as shown in FIG. 2.

As an alternative, as shown in FIG. 3, two isolation valves 285, 185 may be provided, each with solenoids 287, 187 in communication with the controller 131. The isolation valves 285, 185 must be closed to the block flow and return fluid to the unpressurized return reservoir 142. If only solenoid 287 is energized, fluid will pass through the valve 185. If only solenoid 187 is energized, fluid will pass through the valves 285 and 185, even though the solenoid 187 is closed.

INDUSTRIAL APPLICABILITY

An antilock brake system is disclosed that is of the electrohydraulic type. In the event of an electrical failure or malfunction of the controller or engine control module that controls the antilock brake system, the disclosed system converts from an electrohydraulic system to a purely hydraulic system through the use of an isolation valve. The isolation valve may be a normally open two position control valve that is closed during normal operation of the antilock brake system. In the event of an electrical failure, and current is not delivered to the solenoid of the isolation valve, thereby causing the isolation valve to move from a closed position to an open position thereby providing communication between the pressurized fluid reservoir and the brake assemblies. Because the isolation valve is a normally open directional control valve, it moves from its normally open position to a closed position every time the antilock brake system is activated. Thus, because of the regular opening and closing of the isolation valve, there is a reduced chance of the isolation valve becoming stuck in its normally open position or stuck in a closed position when an electrical failure or malfunction of a controller happens. Thus, an antilock brake system with a reliable means for converting the system from an electrohydraulic system to a purely hydraulic system is provided thereby enhancing the safety of antilock brake systems.

What is claimed:

1. An antilock brake system for a vehicle, the system comprising:
a controller, the controller linked to a brake pedal sensor, the brake pedal sensor linked to a brake pedal;
the brake pedal coupled to a normally closed brake pedal valve, the brake pedal valve including an inlet in communication with a source of pressurized hydraulic fluid and an outlet in communication with a normally open isolation valve;
the isolation valve in communication with a main control valve system, the isolation valve linked to the controller which maintains the isolation valve in a closed position by supplying current to the isolation valve, the isolation valve shifting to an open position in the event the current supplied by the controller is interrupted;
the main control valve system in communication with the source of pressurized hydraulic fluid and with at least one brake assembly, the main control valve system linked to the controller for controlling the flow of hydraulic fluid to the at least one brake assembly.

2. The antilock brake system of claim 1 wherein the main control valve system includes a rear brake inlet in communication with the source of pressurized hydraulic fluid and a front brake inlet in communication with the source of pressurized hydraulic fluid;
the rear brake inlet in communication with a rear brake pressure control valve and a rear brake valve, the rear brake pressure control valve linked to the controller and in communication with a rear brake actuator of the rear brake valve, the rear brake valve in communication with at least one rear brake assembly and the rear brake inlet of the main control valve system; and
the front brake inlet in communication with a front brake pressure control valve, the front brake pressure control valve linked to the controller and in communication with a front brake actuator of the front brake valve, the front brake valve in communication with at least one front brake assembly and the front brake inlet of the main control valve system.

3. The antilock brake system of claim 1 wherein the isolation valve includes a solenoid that is linked to the controller that maintains the isolation valve in the closed position by supplying current to the solenoid, the isolation valve further including a biasing element that shifts the isolation valve to the open position when the current from the controller to the solenoid is interrupted.

4. The antilock brake system of claim 1 wherein the main control valve system includes at least one brake valve, the at least one brake valve including an actuator, the at least one brake valve in communication with the at least one brake assembly, the actuator of the at least one brake valve in communication with a shuttle valve, the shuttle valve in communication with the isolation valve when the isolation valve is in the open position.

5. The antilock brake system of claim 4 wherein the main control valve system further includes at least one brake pressure control valve, the brake pressure control valve linked to the controller and in communication with the source of pressurized hydraulic fluid and the shuttle valve.

6. The antilock brake system of claim 2 further including a rear brake shuttle valve disposed between and providing communication between the rear brake pressure control valve and the rear brake actuator of the rear brake valve;
a front brake shuttle valve disposed between and providing communication between the front brake pressure control valve and the front brake actuator of the front brake valve;
the rear brake shuttle valve and the front brake shuttle valve both being in communication with the isolation valve when the isolation valve is in the open position.

7. The antilock brake system of claim 1 further including a slack adjuster disposed between the main control valve system and the at least one brake assembly.

8. The antilock brake system of claim 2 further including a rear brake slack adjuster disposed between the rear brake valve and the at least one rear brake assembly; and
    a front brake slack adjuster disposed between the front brake valve and the at least one front brake assembly.

9. The antilock brake system of claim 1 wherein the isolation valve is in communication with a source of unpressurized hydraulic fluid when the isolation valve is in the closed position during normal operating conditions.

10. The antilock brake system of claim 2 wherein the rear brake valve is movable to an open position when the rear brake actuator receives pressurized hydraulic fluid from the rear brake pressure control valve, the rear brake valve also being movable to a closed position by a biasing element when the rear brake actuator does not receive pressurized hydraulic fluid from the rear brake pressure control valve; and
    the front brake valve being movable to an open position when the front brake actuator receives pressurized hydraulic fluid from the front brake pressure control valve, the front brake valve also being movable to a closed position by a biasing element when the front brake actuator does not receive pressurized hydraulic fluid from the front brake pressure control valve.

11. The antilock brake system of claim 1 wherein the controller includes an electronically commutated motor (ECM).

12. A truck comprising:
    a plurality of wheels including at least one front wheel coupled to a front brake assembly and at least one rear wheel coupled to a rear brake assembly, the front and rear brake assemblies in communication with an antilock brake system;
    the antilock brake system including a controller, the controller linked to a brake pedal sensor, the brake pedal sensor linked to a brake pedal;
    the brake pedal coupled to a normally closed brake pedal valve, the brake pedal valve including an inlet in communication with a source of pressurized hydraulic fluid and an outlet in communication with a normally open isolation valve;
    the isolation valve in communication with a main control valve system, the isolation valve linked to the controller which maintains the isolation valve in a closed position by supplying current to the isolation valve, the isolation valve shifting to an open position in the event the current supplied by the controller is interrupted;
    the main control valve system including a rear brake inlet in communication with the source of pressurized hydraulic fluid and a front brake inlet in communication with the source of pressurized hydraulic fluid;
    the rear brake inlet in communication with a rear brake pressure control valve and a rear brake valve, the rear brake pressure control valve linked to the controller and in communication with a rear brake actuator of the rear brake valve, the rear brake valve in communication with the rear brake assembly and the rear brake inlet of the main control valve system; and
    the front brake inlet in communication with a front brake pressure control valve, the front brake pressure control valve linked to the controller and in communication with a front brake actuator of the front brake valve, the front brake valve in communication with the front brake assembly and the front brake inlet of the main control valve system.

13. The truck of claim 12 wherein the isolation valve includes a solenoid that is linked to the controller that maintains the isolation valve in the closed position by supplying current to the solenoid, the isolation valve further including a biasing element that shifts the isolation valve to the open position when the current from the controller to the solenoid is interrupted.

14. The truck of claim 12 further including a rear brake shuttle valve disposed between and providing communication between the rear brake pressure control valve and the rear brake actuator of the rear brake valve;
    a front brake shuttle valve disposed between and providing communication between the front brake pressure control valve and the front brake actuator of the front brake valve;
    the rear brake shuttle valve and the front brake shuttle valve both being in communication with the isolation valve when the isolation valve is in the open position.

15. The truck of claim 12 further including a rear brake slack adjuster disposed between the rear brake valve and the at least one rear brake assembly; and
    a front brake slack adjuster disposed between the front brake valve and the at least one front brake assembly.

16. The truck of claim 12 wherein the isolation valve is in communication with a source of unpressurized hydraulic fluid when the isolation valve is in the closed position during normal operating conditions.

17. The truck of claim 12 wherein the rear brake valve is movable to an open position when the rear brake actuator receives pressurized hydraulic fluid from the rear brake pressure control valve, the rear brake valve also being movable to a closed position by a biasing element when the rear brake actuator does not receive pressurized hydraulic fluid from the rear brake pressure control valve; and
    the front brake valve being movable to an open position when the front brake actuator receives pressurized hydraulic fluid from the front brake pressure control valve, the front brake valve also being movable to a closed position by a biasing element when the front brake actuator does not receive pressurized hydraulic fluid from the front brake pressure control valve.

18. The truck of claim 12 wherein the controller includes an electronically commutated motor (ECM).

19. The truck of claim 12 further including two brake pedal sensors that are in communication with the controller.

20. A method of a truck equipped with an electrohydraulic antilock brake system when there is an electrical failure, the antilock brake system including a controller linked to a brake pedal sensor, the brake pedal sensor linked to a brake pedal, the brake pedal coupled to a normally closed brake pedal valve, the brake pedal valve including an inlet in communication with a source of pressurized hydraulic fluid and an outlet in communication with a normally open isolation valve, the isolation valve in communication with a main control valve system, the isolation valve linked to the controller which maintains the isolation valve in a closed position during normal operating conditions by supplying current to the isolation valve, the isolation valve shifting to an open position in the event the current supplied by the controller is interrupted, the main control valve system in communication with the source of pressurized hydraulic fluid and with at least one brake assembly, the main control valve system linked to the controller for controlling the flow of hydraulic fluid to the at least one brake assembly, the method comprising:
    shifting the isolation valve to an open position when current from the controller to the isolation valve is interrupted;

passing pressurized hydraulic fluid from the pressurized hydraulic fluid source, through the brake pedal valve, through the isolation valve and to the main control valve system.

* * * * *